United States Patent
Dearborn

(10) Patent No.: US 8,427,123 B2
(45) Date of Patent: Apr. 23, 2013

(54) SYSTEM, METHOD AND APPARATUS TO TRANSITION BETWEEN PULSE WIDTH MODULATION AND PULSE-FREQUENCY MODULATION IN A SWITCH MODE POWER SUPPLY

(75) Inventor: Scott C. Dearborn, Brackney, PA (US)

(73) Assignee: Microchip Technology Incorporated, Chandler, AZ (US)

( * ) Notice: Subject to any disclaimer, the term of this patent is extended or adjusted under 35 U.S.C. 154(b) by 395 days.

(21) Appl. No.: 12/787,066

(22) Filed: May 25, 2010

(65) Prior Publication Data
US 2011/0006744 A1    Jan. 13, 2011

Related U.S. Application Data

(60) Provisional application No. 61/223,994, filed on Jul. 8, 2009.

(51) Int. Cl.
*G05F 1/00* (2006.01)

(52) U.S. Cl.
USPC .......................................... 323/282; 323/273

(58) Field of Classification Search .................. 323/273, 323/282
See application file for complete search history.

(56) References Cited

U.S. PATENT DOCUMENTS

| | | | |
|---|---|---|---|
| RE37,609 E * | 3/2002 | Bittner ........................... | 323/272 |
| 7,230,408 B1 * | 6/2007 | Vinn et al. ..................... | 323/273 |
| 7,906,939 B2 * | 3/2011 | Kung et al. ..................... | 320/128 |
| 2005/0007086 A1 | 1/2005 | Morimoto ..................... | 323/282 |
| 2006/0033483 A1 * | 2/2006 | Wu ................................. | 323/282 |
| 2007/0159151 A1 | 7/2007 | Katoh et al. ................... | 323/285 |
| 2007/0257647 A1 | 11/2007 | Chen et al. ..................... | 323/282 |
| 2008/0180078 A1 | 7/2008 | Hiasa ............................. | 323/282 |
| 2008/0225563 A1 | 9/2008 | Seo ................................. | 363/123 |

FOREIGN PATENT DOCUMENTS

JP    11089222    3/1999

OTHER PUBLICATIONS

International PCT Search Report and Written Opinion, PCT/US2010/041159, 9 pages, Mailed Frb. 28, 2011.

* cited by examiner

*Primary Examiner* — Adolf Berhane
*Assistant Examiner* — Emily Pham
(74) *Attorney, Agent, or Firm* — King & Spalding L.L.P.

(57) ABSTRACT

A switch mode power supply (SMPS) has optimized efficiency over an entire operating range, from no load to full load, by transitioning between pulse frequency modulation (PFM) and pulse width modulation (PWM) for control of the SMPS depending upon load current. Accurate, smooth, and seamless transitions between PFM and PWM modes of operation occur at a preset load current(s). PFM operation improves efficiency during light load conditions, and PWM has better efficiency at higher load currents. This is advantageous in battery powered applications, and thereby results in a longer time before battery replacement or recharge is necessary.

22 Claims, 15 Drawing Sheets

SYSTEM, METHOD AND APPARATUS TO TRANSITION BETWEEN PULSE WIDTH MODULATION AND PULSE-FREQUENCY MODULATION IN A SWITCH MODE POWER SUPPLY

RELATED PATENT APPLICATION

This application claims priority to commonly owned U.S. Provisional Patent Application Ser. No. 61/223,994; filed Jul. 8, 2009; entitled "System, Method and Apparatus To Transition Between Pulse-Width Modulation and Pulse-Frequency Modulation in a Switch Mode Power Supply," by Scott Dearborn, and is hereby incorporated by reference herein for all purposes.

TECHNICAL FIELD

The present disclosure relates to switch mode power supplies, and, more particularly, to improving efficiency of a switch mode power supply (SMPS) by transitioning between pulse-width modulation (PWM) and pulse-frequency modulation (PFM) control depending upon load.

BACKGROUND

A switch mode power supply (SMPS) may operate by using either pulse-width modulation (PWM) or pulse-frequency modulation (PFM) control to the power switching transistor(s). PWM operation of the SMPS is efficient during higher load conditions but drops off in efficient operation under light load condition. PFM control results in higher efficiency of the SMPS during light load conditions, but results in less efficiency at higher load conditions. High efficiency is important in a SMPS especially when used in battery powered applications. FIG. 12 shows a graph of typical efficiencies of an SMPS over a range of output load currents when using PFM or PWM control.

SUMMARY

Therefore it is desired to optimize the SMPS efficiency over its entire operating range, from no load to full load, by reliably transitioning between PFM and PWM for control of the SMPS depending upon load current. Accurate, smooth, and seamless transitions between PFM and PWM modes of operation may occur at a factory set load current(s). PFM operation improves efficiency during light load conditions, and PWM has better efficiency at higher load currents. This is a highly desired feature in battery powered applications, and results in a longer time before battery replacement or recharge is necessary. The SMPS may be, for example but is not limited to, buck, boost, buck-boost, fly-back, etc., employing voltage mode, peak current mode, or average current mode control.

According to a specific example embodiment of this disclosure, a switch mode power supply (SMPS) using pulse-frequency modulation (PFM) control or pulse-width modulation (PWM) control, comprises: a switch mode power supply (SMPS) converter; and a load determination circuit for detecting when a load current reaches a transition current value, wherein if the load current is less than the transition current value then a pulse-frequency modulation (PFM) signal controls the SMPS converter, and if the load current is equal to or greater than the transition current value then a pulse-width modulation (PWM) signal controls the SMPS converter.

According to another specific example embodiment of this disclosure, a method for controlling a switch mode power supply (SMPS) using pulse-frequency modulation (PFM) control or pulse-width modulation (PWM) control, comprises: determining a load current of a switch mode power supply (SMPS) converter; comparing the load current to a transition current value; controlling the SMPS converter with a pulse-frequency modulation (PFM) signal when the load current is less than the transition current value; and controlling the SMPS converter with a pulse-width modulation (PWM) signal when the load current is equal to or greater than the transition current value.

According to yet another specific example embodiment of this disclosure, a method for controlling a switch mode power supply (SMPS) using pulse-frequency modulation (PFM) control or pulse-width modulation (PWM) control comprises the steps of: a) disabling operation of a switch mode power supply (SMPS) converter; b) determining whether an output voltage from the SMPS converter is below a reference voltage, wherein b1) if the output voltage is not below the reference voltage then returning to step a), and b2) if the output voltage is below the reference voltage then enabling operation of the SMPS converter; c) storing energy in an inductor; d) determining whether a control demand is met, wherein d1) if the control demand is not met then returning to step c), and d2) if the control demand is met then transferring the energy stored in the inductor to an output capacitor; e) determining whether the output voltage from the SMPS converter is below the reference voltage, wherein e1) if the output voltage is not below the reference voltage then returning to step a), and e2) if the output voltage is below the reference voltage then returning to step c.

BRIEF DESCRIPTION OF THE DRAWINGS

A more complete understanding of the present disclosure thereof may be acquired by referring to the following description taken in conjunction with the accompanying drawings wherein.

Figure 2:
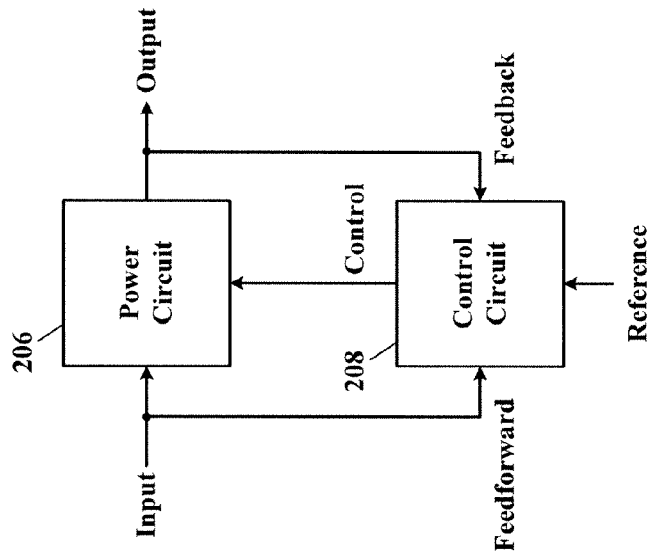
FIG. 2 illustrates a more detailed schematic block diagram of the general power regulator shown in FIG. 1.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

In a general sense, a power converter can be defined as a device which converts one form of energy into another on a continuous basis. Any storage or loss of energy within such a power system while it is performing its conversion function is usually identical to the process of energy translation. There are many types of devices which can provide such a function with varying degrees of cost, reliability, complexity, and efficiency. The mechanisms for power conversion can take many basic forms, such as those which are mechanical, electrical, or chemical processing in nature. The focus of herein will be on power converters which perform energy translation electrically and in a dynamic fashion, employing a restricted set of components which include inductors, capacitors, transformers, switches and resistors. How these circuit components are connected is determined by the desired power translation. Resistors introduce undesirable power loss. Since high efficiency is usually an overriding requirement in most applications, resistive circuit elements should be avoided or minimized in a main power control path. Only on rare occasions and for very specific reasons are power consuming resistances introduced into the main power control path. In auxiliary circuits, such as sequence, monitor, and control electronics of total system, high value resistors are common place, since their loss contributions are usually insignificant.

Figure 1:
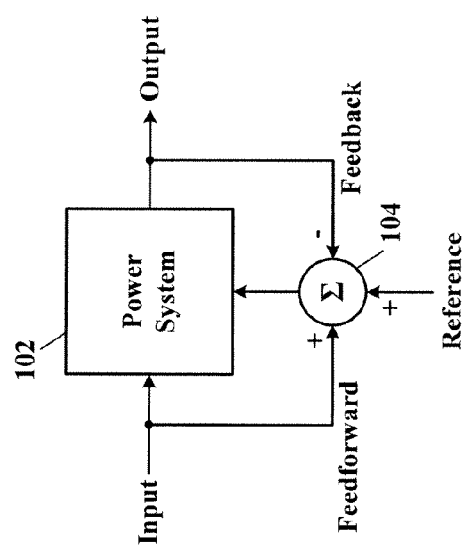
FIG. 1 illustrates a schematic block diagram of a basic regulator system.

Referring to FIG. 1, depicted is a schematic block diagram of a basic regulator system. A power system 102, e.g., a basic switch-mode power converter where an input of an uncontrolled source of voltage (or current, or power) is applied to the input of the power system 102 with the expectation that the voltage (or current, or power) at the output will be very well controlled. The basis of controlling the output is some form of reference, and any deviation between the output and the reference becomes an error. In a feedback-controlled system, negative feedback is used to reduce this error to an acceptable value, as close to zero required by the system. It is desirable, typically, to reduce the error quickly, but inherent with feedback control is the trade-off between system response and system stability. The more responsive the feedback network is, the greater becomes the risk of instability.

At this point, it should be mentioned that there is another method of control—feed forward. With feed forward control, a control signal is developed directly in response to an input variation or perturbation. Feed forward is less accurate than feedback since output sensing is not involved, however, there is no delay waiting for an output error signal to be developed, and feed forward control cannot cause instability. It should be clear that feed forward control typically is not adequate as the only control method for a voltage regulator, but it is often used together with feedback to improve a regulator's response to dynamic input variations.

Referring to FIG. 2, depicted is a more detailed schematic block diagram of the general power regulator shown in FIG. 1. The power system 102 has been separated into two blocks: the power circuit 206 and the control circuit 208. The power circuit 206 handles the power system load current and is typically large, robust, and subject to wide temperature fluctuations. Its switching functions are by definition, large-signal phenomenon, normally simulated in most stability analyses as just a two-state switch with a duty cycle. The output filter (not shown) is also considered as a part of the power circuit 206, but can be considered as a linear block. The control circuit 208 will normally be made up of a gain block, an error amplifier, and a pulse-width modulator, used to define the duty cycle for the power switches. According to the teachings of this disclosure, a control circuit 208 for a smooth, seamless transition between Pulse-Frequency Modulation (PFM) and Pulse-Width Modulation (PWM) is more fully described hereinbelow. PFM reduces the effective rate at which the power circuit 206 is controlled, reducing the switching losses, and increases the efficiency at light loads.

PFM may also be represented as pulse density modulation (PDM) since on and off control of the power circuit 206 switches, e.g., power field effect transistors, at some many times per time period. PFM/PDM allows better efficiency of the power circuit 206 at low demand levels because the number of pulses per time period is reduced, thereby reducing the number of times per time period that the switches of the power circuit 206 are turned on and off. Because the components, e.g., switches, FETs, etc., of the power circuit 206 are not lossless, every time a switch (FET) in the power circuit 206 changes from off-to-on or on-to-off, some power is lost during the transition. In PWM control of the power circuit 206 switches, the PWM is a continuous plurality of pulses at a certain frequency or number of pulses per time period. PWM control of the power circuit 206 is effected by varying the duty cycle of each pulse of the continuous plurality of pulses. Generally, the duty cycle of the PWM pulses may be varied from zero (0) percent to a less than one hundred (100) percent duty cycle. To use a PWM control signal at light load conditions is wasteful and inefficient since power circuit control using a PFM/PDM having fewer pulses per time period, is the better choice, according to the teachings of this disclosure. The PWM pulse duty cycle is limited at the high end since the voltage on a power inductor must be switched on and off, otherwise the switching power supply could not function.

The control transition from PFM to PWM is based on the premise that the switching regulator power converter is operating in discontinuous conduction mode at the transition point. In other words, all the energy stored in the inductor is transferred to the system load each cycle. This premise is always valid for a properly designed switching regulator power converter.

Figure 3:
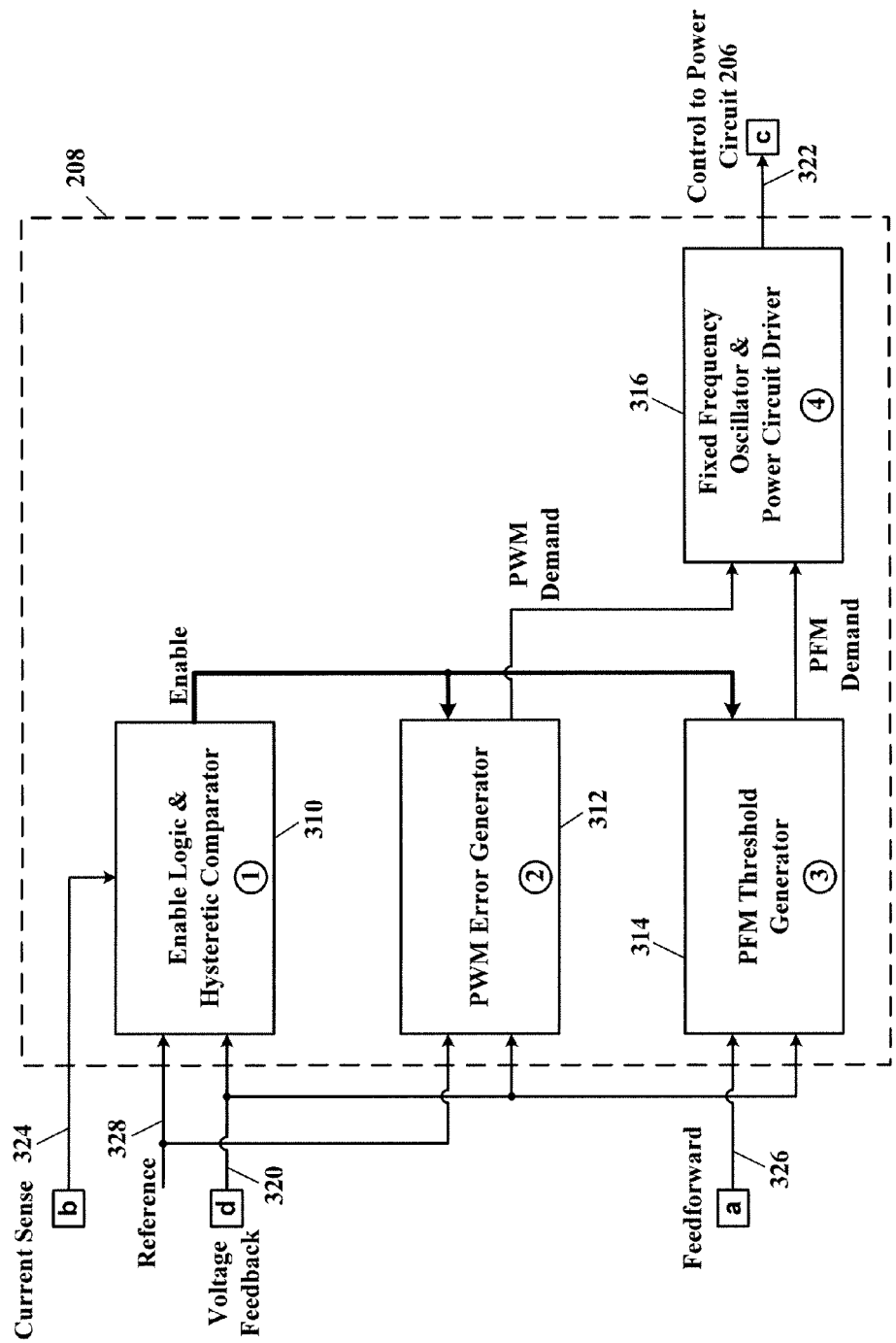
FIG. 3 illustrates a schematic block diagram of a control circuit, according to the teachings of this disclosure.
Figure 4:
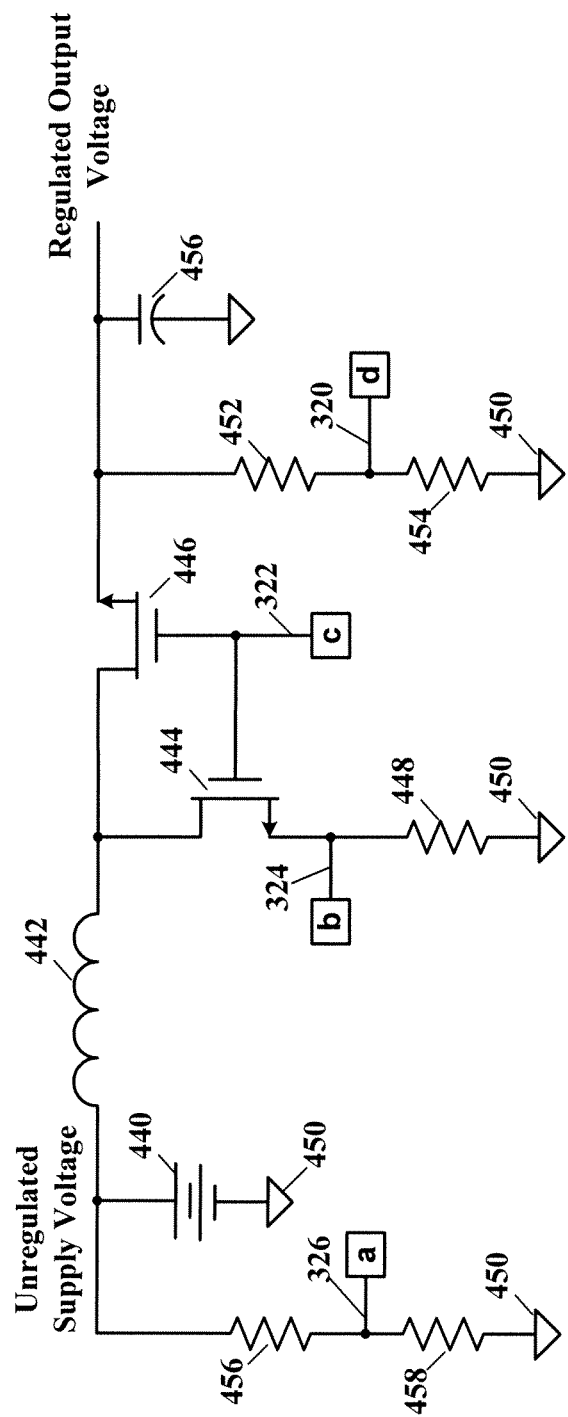
FIG. 4 illustrates a schematic diagram of a power switching regulator circuit controlled by the control circuit shown in FIG. 3, according to the teachings of this disclosure.

Referring now to FIGS. 3 and 4, depicted in FIG. 3 is a schematic block diagram of a control circuit, and in FIG. 4 is a schematic diagram of a power switching regulator circuit controlled by the control circuit shown in FIG. 3, according to the teachings of this disclosure. A SMPS may comprise a power source, e.g., battery, 440; a power inductor 442, a shunt switch 444, e.g., power field effect transistor; a series pass switch 446, e.g., power field effect transistor; a load capacitor 456 for smoothing alternating current (AC) ripple from the desired direct current (DC) output, a current sense resistor 448, and output voltage divider resistors 452 and 454. Power source commons or grounds 450 are also indicated in FIG. 4.

Operation begins when a voltage feedback signal at node 320 is below a reference voltage at node 328. The voltage feedback signal at node 320 represents the value of the regulated output voltage (FIG. 4). When this condition is true, operation is enabled. PFM control operation occurs when the PWM duty cycle (on-time putting energy into an inductor 442) demand is less than a fixed, or minimum, duty cycle demand. In this mode, more energy is put into the inductor 442 than is required to maintain output voltage regulation. The volt-time across the inductor 442 is not balanced for the input and output conditions. Therefore, the output voltage cannot be in a steady-state condition and is in a rising transition state. In PFM operation, the average output is maintained by the hysteretic comparator 310 controlling the PFM threshold generator 314. Load current is determined with the current sense resistor 448.

Figure 6:
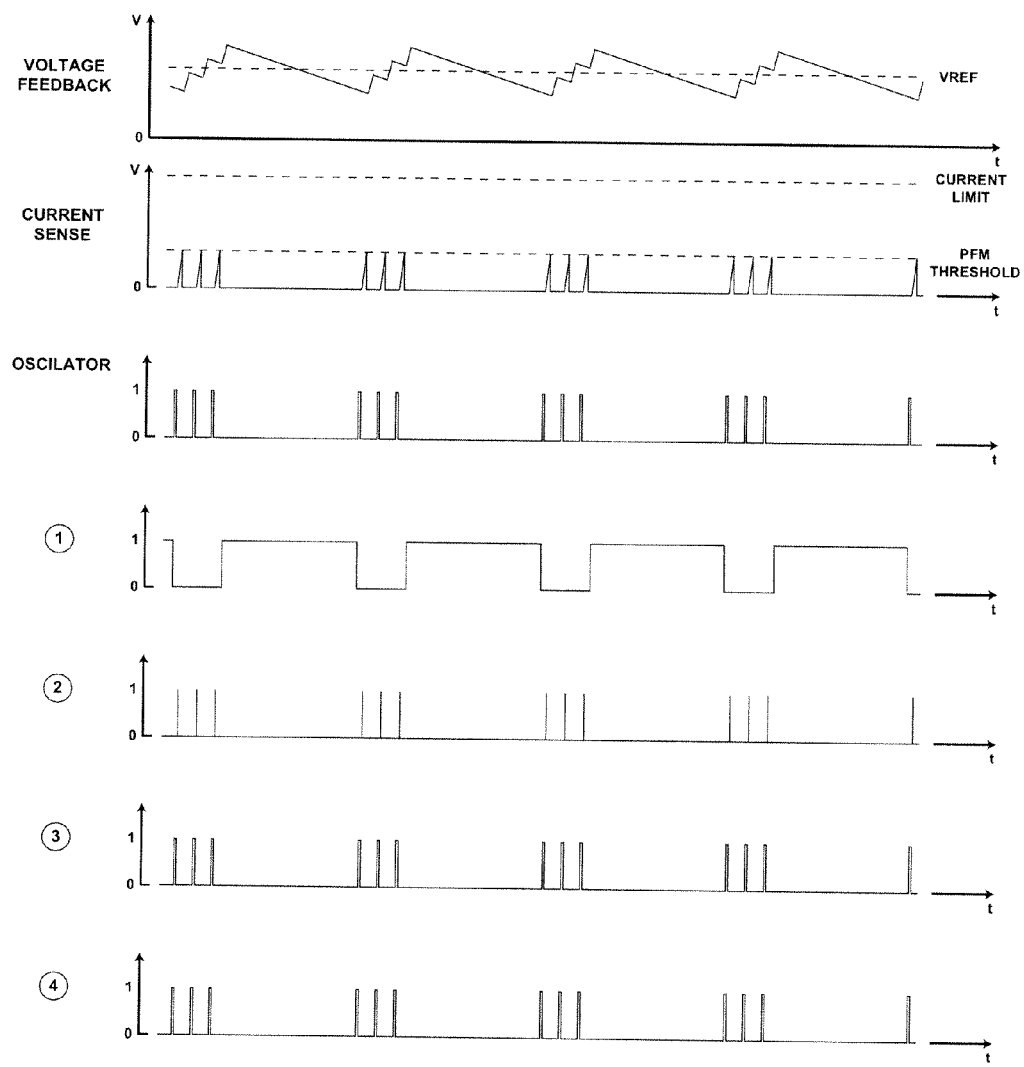
FIG. 6 illustrates schematic operational timing diagrams of the control circuit shown in FIG. 3 during pulse frequency modulation (PFM) operation, according to the teachings of this disclosure.
Figure 7:
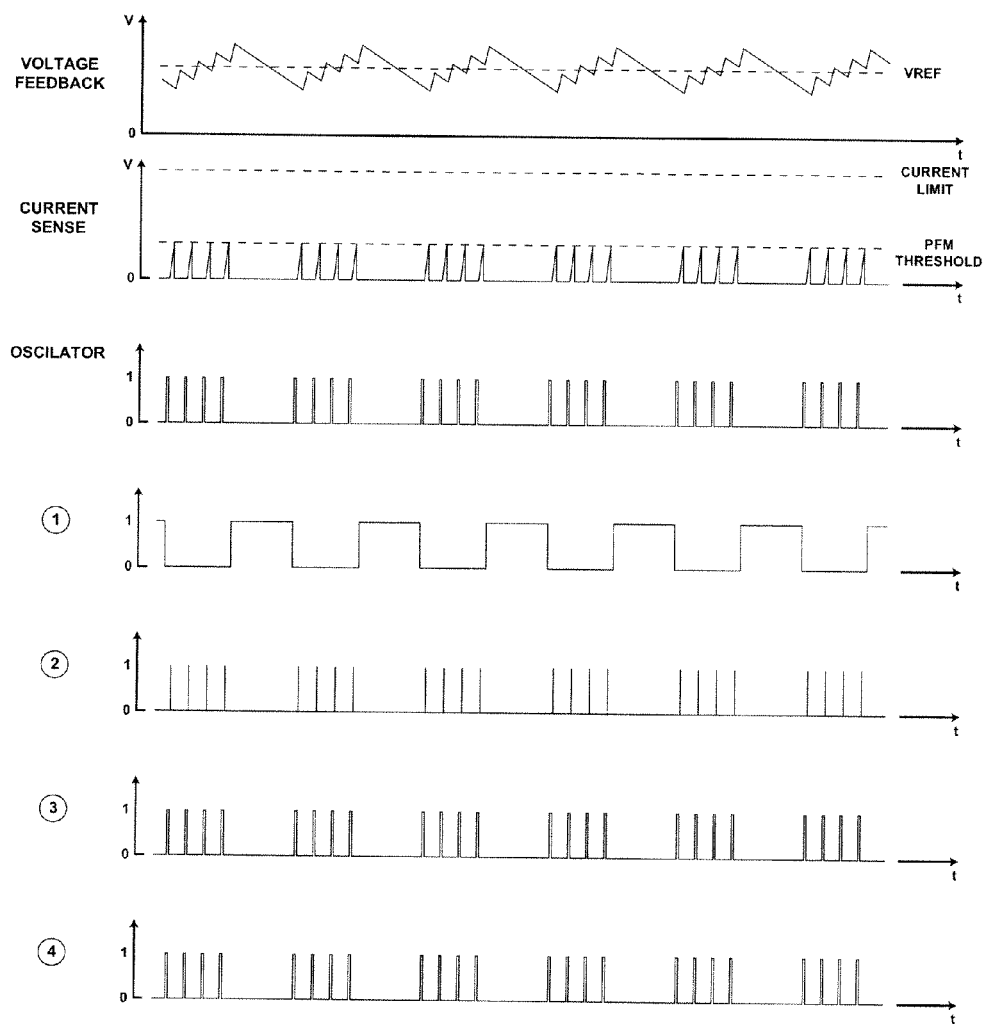
FIG. 7 illustrates schematic operational timing diagrams of the control circuit shown in FIG. 3 during PFM operation at increased load, according to the teachings of this disclosure.
Figure 8:
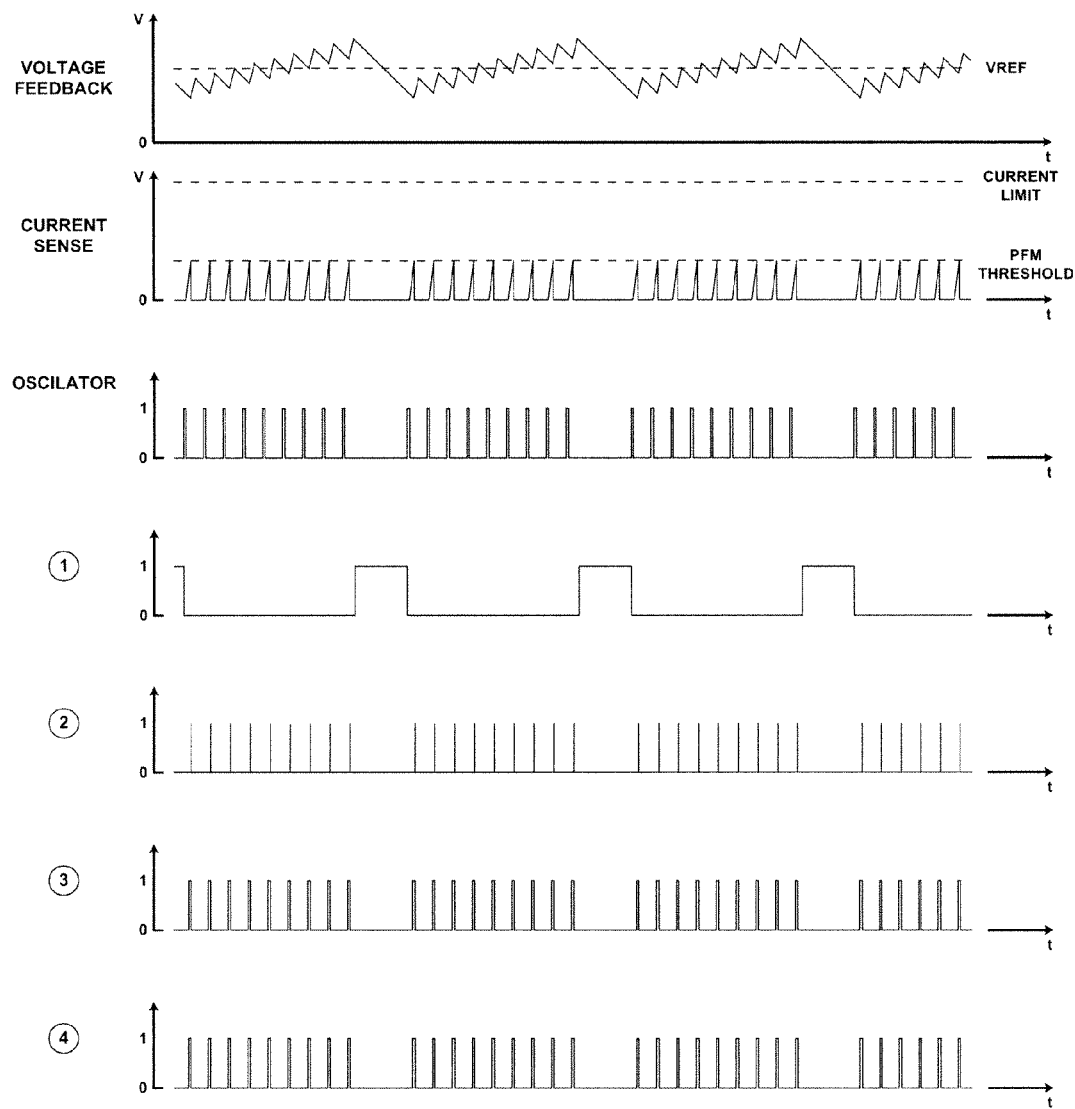
FIG. 8 illustrates schematic operational timing diagrams of the control circuit shown in FIG. 3 during PFM operation at further increased load, according to the teachings of this disclosure.

Referring to FIGS. 6, 7, and 8, depicted are various schematic PFM operational timing diagrams of the control circuit shown in FIGS. 3 and 4 as the load current increases. When the load current reaches a transition point, the PFM operation is not able to raise the output above the low level of the hysteretic comparator 310. The PWM error generator circuit 312 requires a higher duty cycle than the PFM threshold generator circuit 314, driving the error to zero (feedback equal to the reference). The PWM error generator circuit 312 is now in control of the power circuit 206 output regulation and a seamless transition has occurred.

Figure 9:
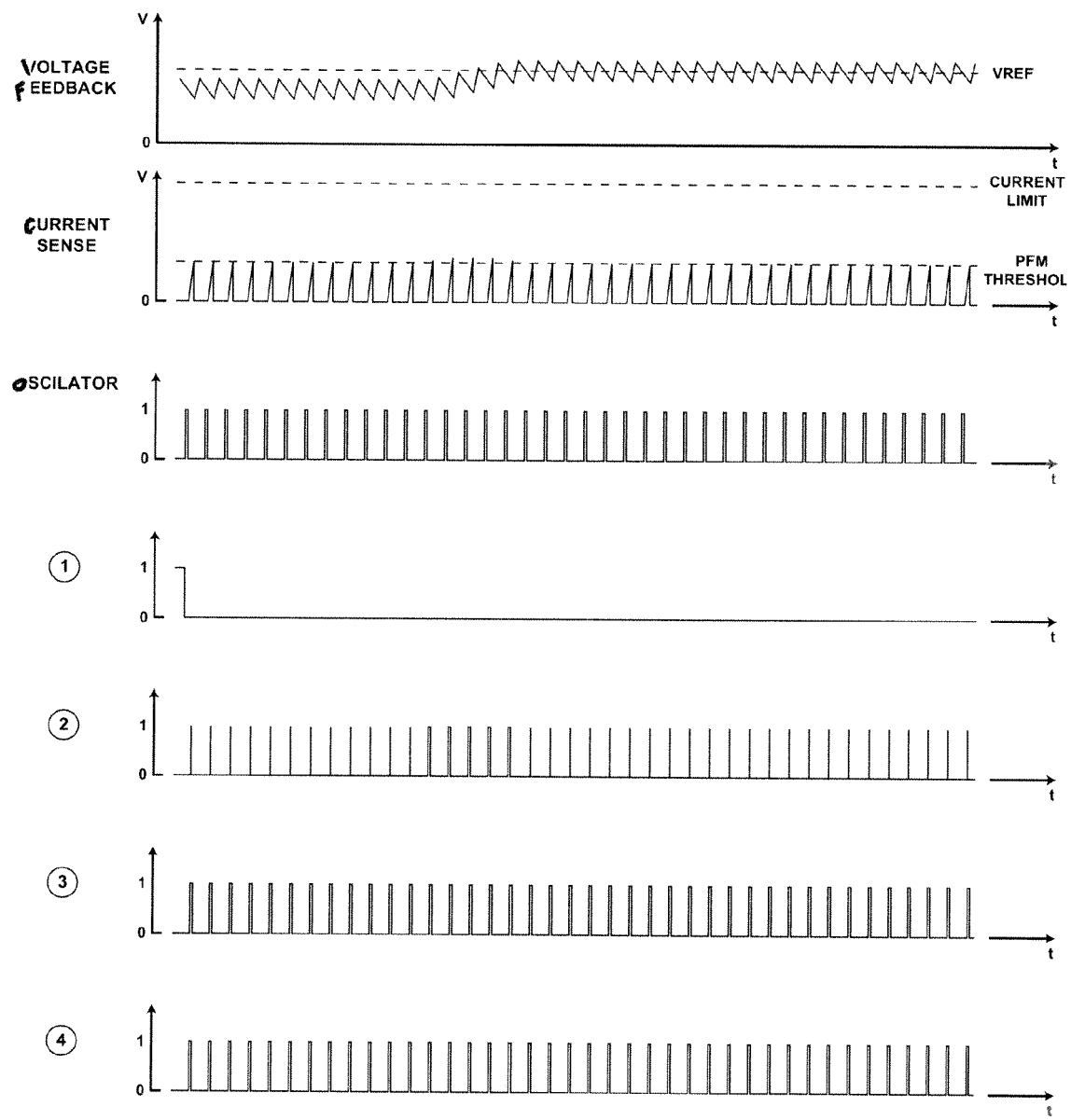
FIG. 9 illustrates schematic operational timing diagrams of the control circuit shown in FIG. 3 during a transition from PFM to pulse width modulation (PWM) operation, according to the teachings of this disclosure.

FIG. 9 depicts a seamless transition to the PWM mode of operation. If the output voltage reaches the low level of the hysteretic comparator 310 with a load current above the transition threshold, the PFM operation is not able to sustain the output voltage. The output voltage will continue to decrease until the PWM error generator circuit 312 supplies a higher duty cycle, driving the error to zero (feedback equal to the reference).

Figure 10:
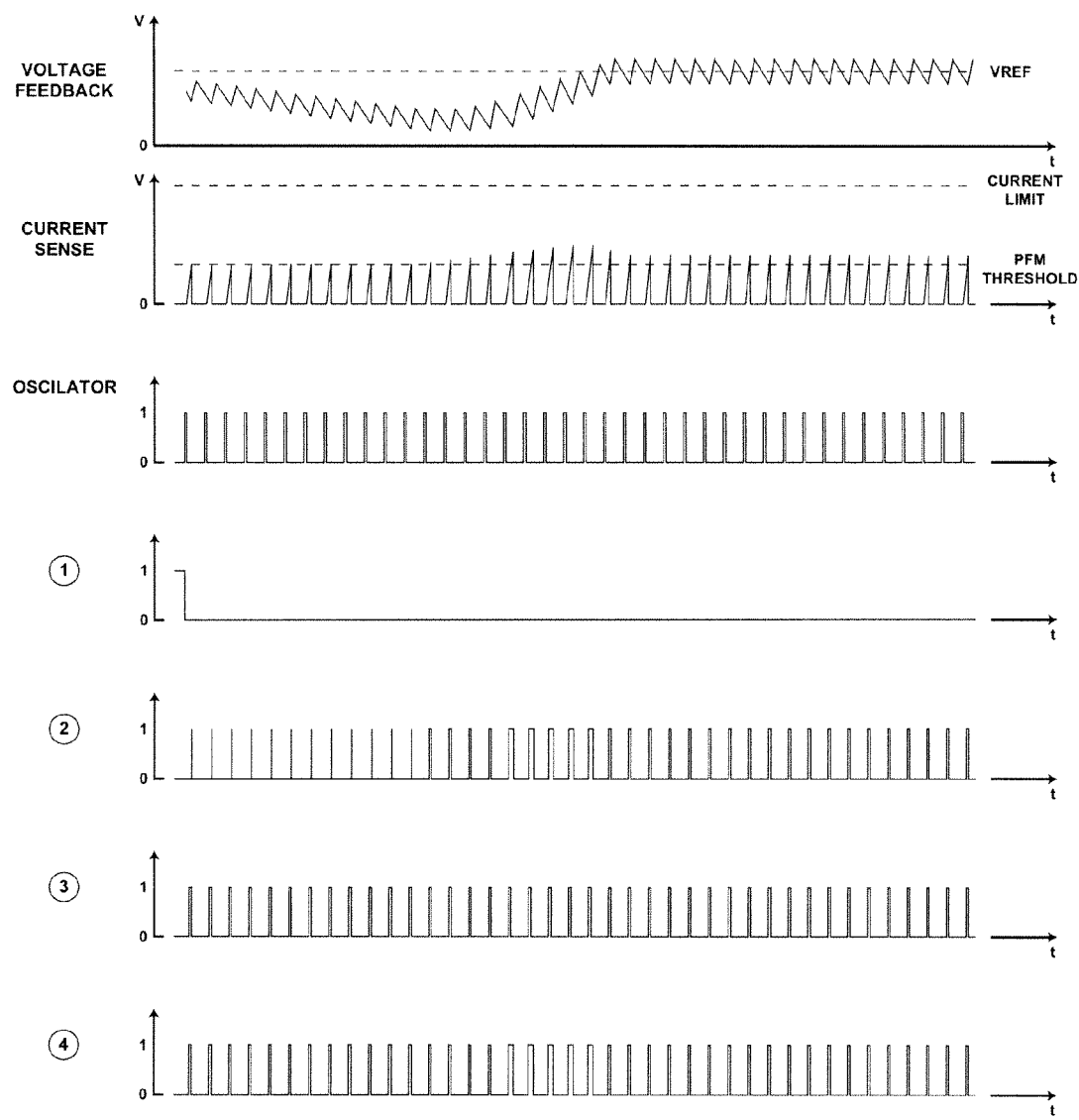
FIG. 10 illustrates schematic operational timing diagrams of the control circuit shown in FIG. 3 during a load step in operation, according to the teachings of this disclosure.

FIG. 10 depicts a load step from a light load condition to a load above the transition point. The converter is disabled via the hysteretic comparator 310, then a load current above the transition point decreases the output below the low level of the hysteretic comparator 310. A minimum duty cycle is supplied from the PFM threshold generator circuit 314. However, PFM control is not able to sustain the output voltage required (not high enough duty cycle). The volt-time across the inductor 442 is not balanced in this case for the input and output conditions. Therefore, the output cannot be in a steady-state condition and is in a falling transition state. The output will continue to decrease until the PWM error generator supplies a higher duty cycle, driving the error to zero (feedback equal to the reference).

Figure 11:
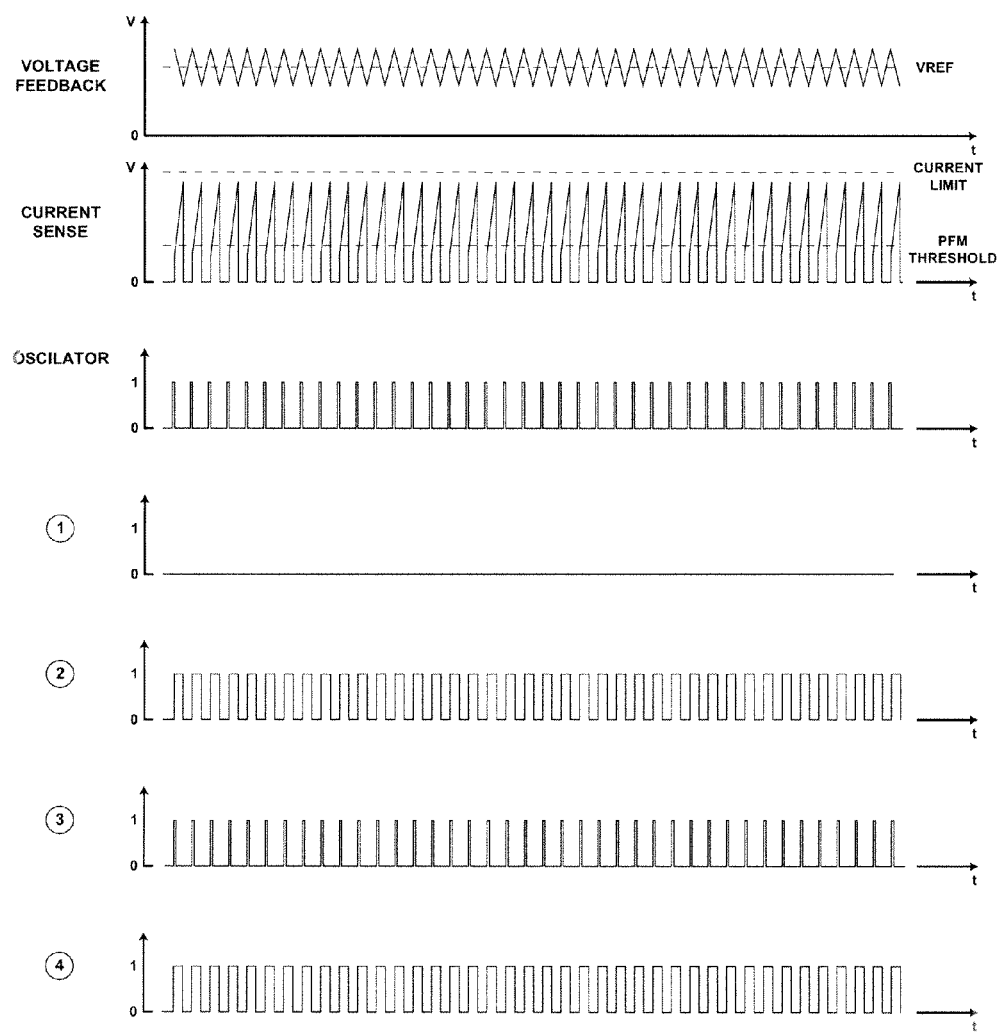
FIG. 11 illustrates schematic operational timing diagrams of the control circuit shown in FIG. 3 during PWM continuous conduction mode operation, according to the teachings of this disclosure.
Figure 12:
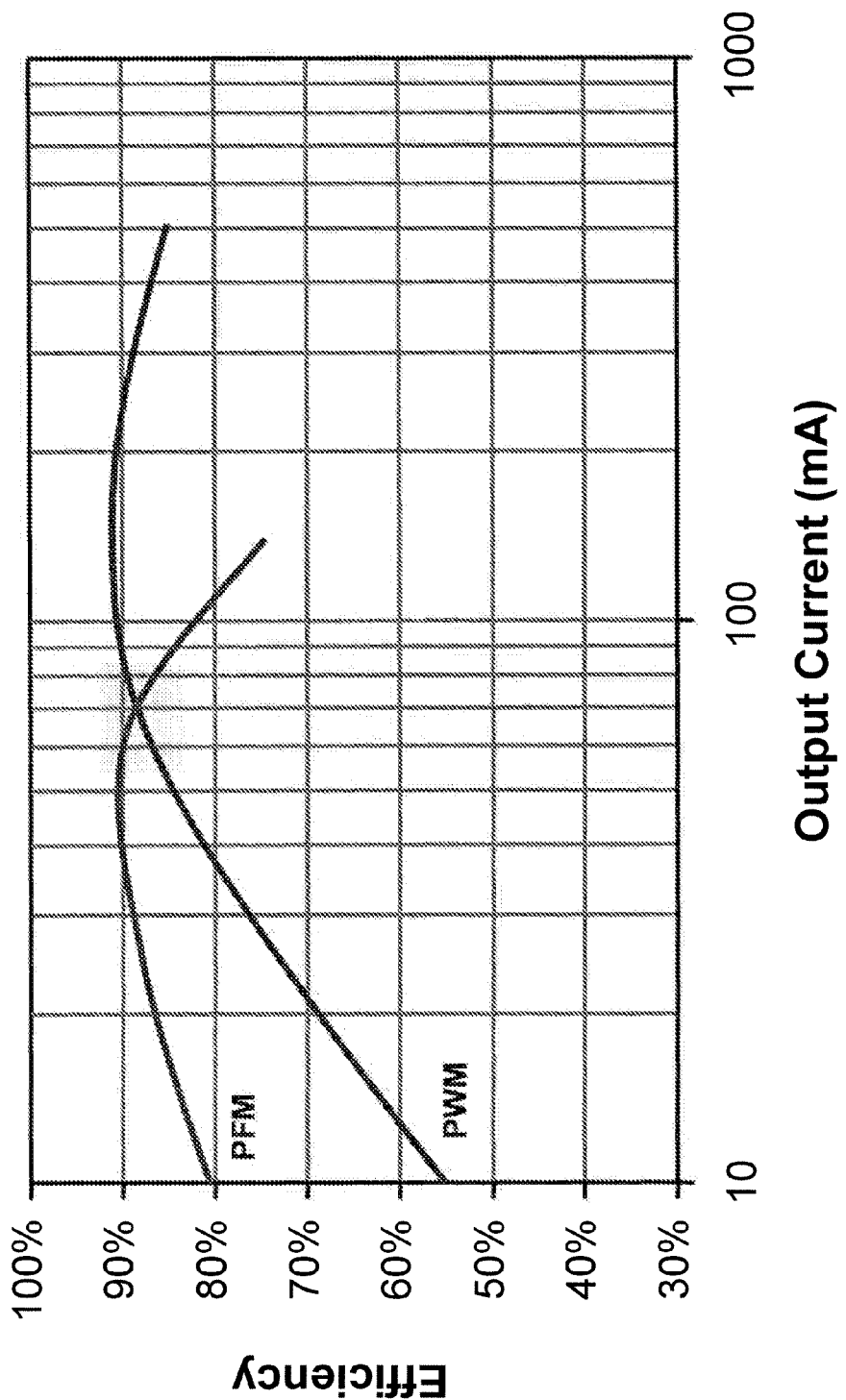
FIG. 12 illustrates a graph of typical efficiencies of an SMPS over a range of output load currents when using PFM or PWM control.

FIG. 11 depicts operation during continuous conduction mode. In an ideal converter, the duty cycle is independent of output current. PWM control is only valid during continuous conduction mode. The transition point may be determined by the PFM Threshold generated by the PFM threshold generator 314. The threshold may be adjusted based upon input and output conditions of the switching regulator power system. This provides a consistent transition point over all operating conditions. This transition method provides the optimal switching power supply converter efficiency, independent of the load current transition point. The transition point does, however, affect the minimum amount of output ripple present during PFM operation. The higher the load current transition point, the more will be the output ripple.

Figure 5:
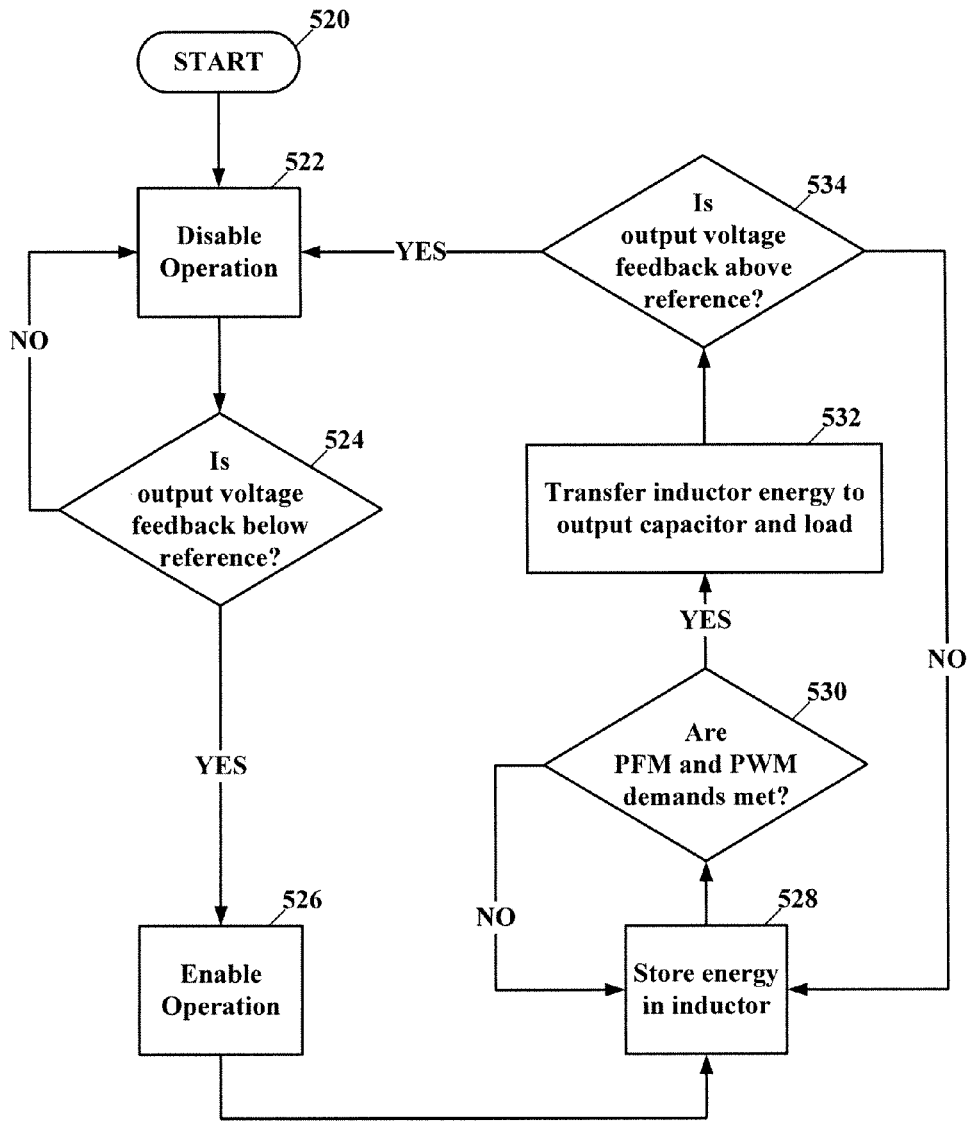
FIG. 5 illustrates a schematic flow diagram of a process control method, according to a specific example embodiment of this disclosure.

Referring to FIG. 5, depicted is a schematic flow diagram of a process control method, according to a specific example embodiment of this disclosure. At step 520 operation of the SMPS begins. In step 522 operation of the SMPS is disabled. In step 524 a determination is made whether the regulated output voltage is below a reference voltage (desired operating output voltage). A voltage divider comprising resistors 452 and 454 may be used to divide the regulated output voltage to a lower voltage feedback signal 320 (see FIGS. 3 and 4). If the output voltage is not below the reference voltage then no additional energy need be placed into the inductor 442. However, if the output voltage is below the reference voltage then in step 526 additional energy is placed into the inductor 442 through the switch 444. Wherein the switch 444 adds additional energy to the inductor 442 in step 528.

Then in step 530 a determination is made whether the PFM and PWM control demands are met. If not, then more energy is added to the inductor 442. If these demands are met then in step 532 the energy stored in the inductor 442 is transferred to the output capacitor 456 through switch 446. Next in step 534 the output voltage is checked to see if it is above the reference voltage. If so, then operation of the SMPS is disabled in step 522 and the control cycle begins again. If the output voltage is not above the reference voltage then additional energy is stored in the inductor 442 in step 528.

The key to a smooth transitional between PFM and PWM control is based upon a load current value that may be defined during design, testing, and/or application of the SMPS. PFM control is more efficient when the load current is below a PFM current threshold (see FIGS. 6, 7 and 8) and the output voltage can be maintained during at least a portion of the cycle time above the reference voltage. However, once the output voltage cannot be maintained above the reference voltage (see FIG. 9) then PWM control must take over. This is easy to understand in that PFM enables a more efficient (lower losses) SMPS because the power switches do not transition as many times (fewer control pulses) in a time period as would be the case in a straight PWM control. However, the efficiency enabling attributes of PFM control ends once the feedback error demand requires that the maximum number of PFM pulses are required in a time period. Once the PFM pulses can no longer supply the necessary energy to the inductor 442, PWM control must take over. PWM control has the same number of pulses per time period but each of those PWM pulse may have its duty cycle (on-time verses off-time) varied between zero (0) percent minimum and about ninety (90) percent maximum. To illustrate further, PFM at its maximum number of pulses per time interval will provide the same energy to the inductor 442 as will a PWM signal at the same duty cycle and at the same number of pulses per time interval.

Further increase of energy to the inductor 442 will necessitate that the on pulse width be greater than the PFM pulse width. This can only be accomplished with PWM control. By monitoring primarily load current and secondarily monitoring output voltage, optimal transition points may be ascertained for switching control between PFM/PDM and PWM. The number of pulses per time interval (frequency of operation) depends upon the circuit design of the power switching regulator, e.g., inductor and capacitor values.

Figure 13:
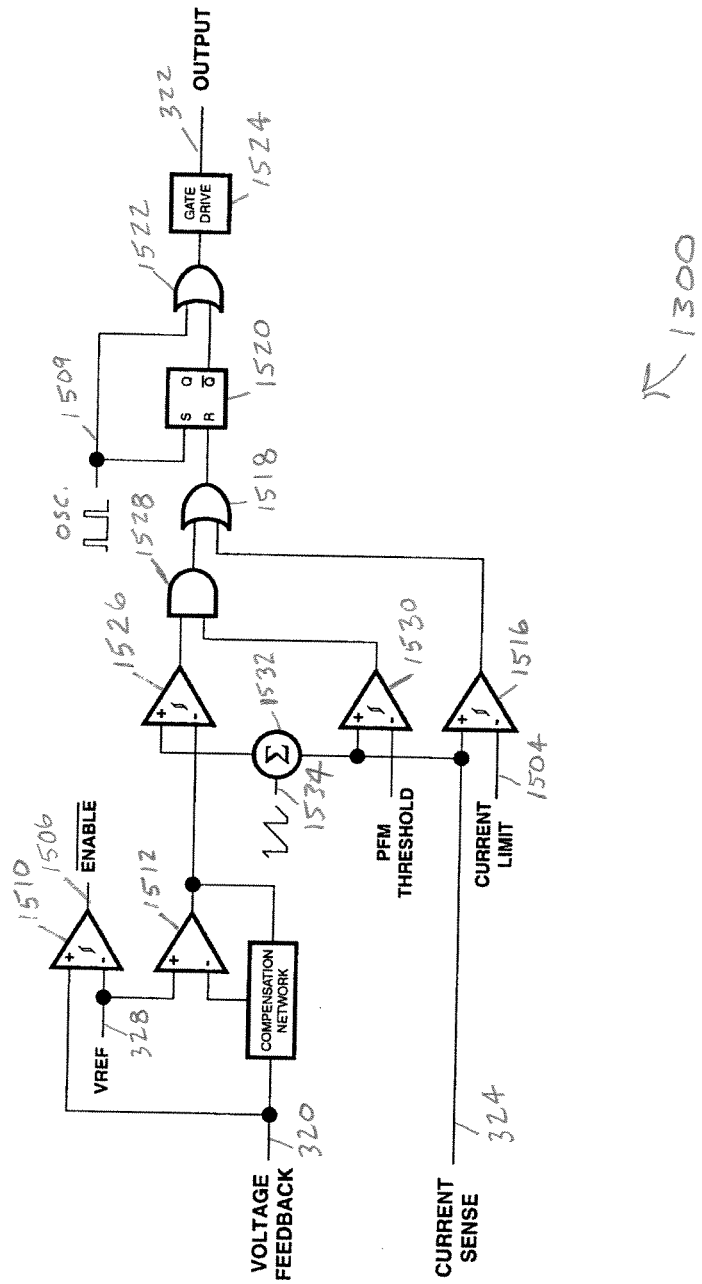
FIG. 13 illustrates a schematic diagram of an analog PFM/PWM SMPS controller, according to a specific example embodiment of this disclosure.

Referring to FIG. 13, depicted is a schematic diagram of an analog PFM/PWM SMPS controller, according to a specific example embodiment of this disclosure. An analog PFM/PWM SMPS controller, generally represented by the numeral 1300, comprises voltage comparators 1510, 1516, 1526 and 1530; an operational amplifier 1512 having a compensation network, a summation circuit 1532, an AND gate 1528, OR gates 1518 and 1522, a RS flip-flop 1520, and a driver 1524. An oscillator (not shown) supplies a clock signal at node 1509.

The comparator 1510 is used to generate an enable signal at node 1506 whenever the voltage feedback signal at node 320 is greater than a reference voltage, Vref, at node 328. The reference voltage, Vref, may be supplied from a very low power voltage reference (not shown). The operational amplifier 1512 is part of the control loop wherein an error signal from the output of the operational amplifier 1512 is used to control the PFM and PWM generator. This error signal is based upon a difference between the voltage feedback signal and reference voltage.

This specific embodiment employs peak current mode control. The summation circuit 1532 adds a slope compensation ramp at node 1534 to the current sense signal, producing the controlled quantity applied to the positive input of the PWM comparator 1526. The operational amplifier 1512 produces an error signal applied to the negative input of the PWM comparator 1526. The error signal establishes the PWM demand acting on the controlled quantity and, effectively, controls the PWM duty cycle demand. The PFM threshold applied to the negative input of the PFM comparator 1530 establishes the PFM duty cycle demand. The greater of the two demands controls the cycle-by-cycle energy stored in inductor 442. When the PFM duty cycle demand is greater, the volt-time across the inductor 442 is not balanced for the input and output conditions. Therefore, the output voltage cannot be in a steady-state condition and is in a rising transition state. In PFM operation, the average output is maintained by the hysteretic comparator 1510 enabling and disabling the PFM and PWM duty cycle generators, effectively reducing the number of switch transitions per time period. When the PWM duty cycle demand is greater, the volt-time across the inductor 442 is balanced. Therefore, the output voltage is in a steady-state condition. In PWM operation, the output voltage is maintained by the PWM duty cycle demand established via the error signal. The hysteretic comparator 1510 enables the control continuously. Comparator 1516 is utilized for over current protection in abnormal operating conditions.

Figure 14:
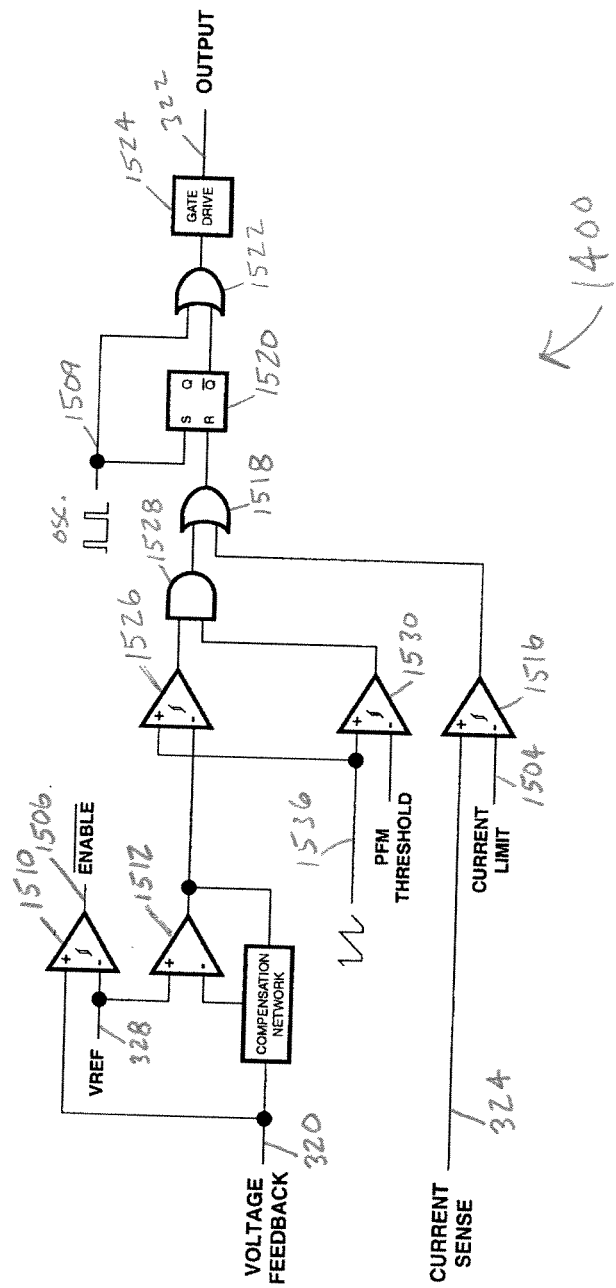
FIG. 14 illustrates a schematic diagram of an analog PFM/PWM SMPS controller, according to another specific example embodiment of this disclosure.

Referring to FIG. 14, depicted is a schematic diagram of an analog PFM/PWM SMPS controller, according to another specific example embodiment of this disclosure. An analog PFM/PWM SMPS controller, generally represented by the numeral 1400, comprises voltage comparators 1510, 1516, 1526 and 1530; an operational amplifier 1512 having a compensation network, an AND gate 1528, OR gates 1518 and 1522, an RS flip-flop 1520, and a driver 1524. An oscillator (not shown) supplies a clock signal at node 1509.

The comparator 1510 is used to generate an enable signal at node 1506 whenever the voltage feedback signal at node 320 is greater than a reference voltage, Vref, at node 328. The reference voltage, Vref, may be supplied from a very low power voltage reference (not shown). The operational amplifier 1512 is part of the control loop wherein an error signal from the output of the operational amplifier 1512 is used to control the PFM and PWM generator. This error signal is based upon a difference between the voltage feedback signal and reference voltage.

The embodiment shown in FIG. 14 employs voltage (or direct duty cycle) mode control. A fixed voltage ramp at node 1536 is the controlled quantity applied to the positive input of the PWM comparator 1526. The operational amplifier 1512 produces an error signal applied to the negative input of the PWM comparator 1526. The error signal establishes the PWM demand acting on the controlled quantity and, effectively, controls the PWM duty cycle demand. The PFM threshold applied to the negative input of the PFM comparator 1530 establishes the PFM duty cycle demand. The greater of the two demands controls the cycle-by-cycle energy stored in inductor 442. When the PFM duty cycle demand is greater, the volt-time across the inductor 442 is not balanced for the input and output conditions. Therefore, the output voltage cannot be in a steady-state condition and is in a rising transition state. In PFM operation, the average output is maintained by the hysteretic comparator 1510 enabling and disabling the PFM and PWM duty cycle generators, effectively reducing the number of switch transitions per time period. When the PWM duty cycle demand is greater, the volt-time across the inductor 442 is balanced. Therefore, the output voltage is in a steady-state condition. In PWM operation, the output voltage is maintained by the PWM duty cycle demand established via the error signal. The hysteretic comparator 1510 enables the control continuously. Comparator 1516 is utilized for over current protection in abnormal operating conditions.

Figure 15:
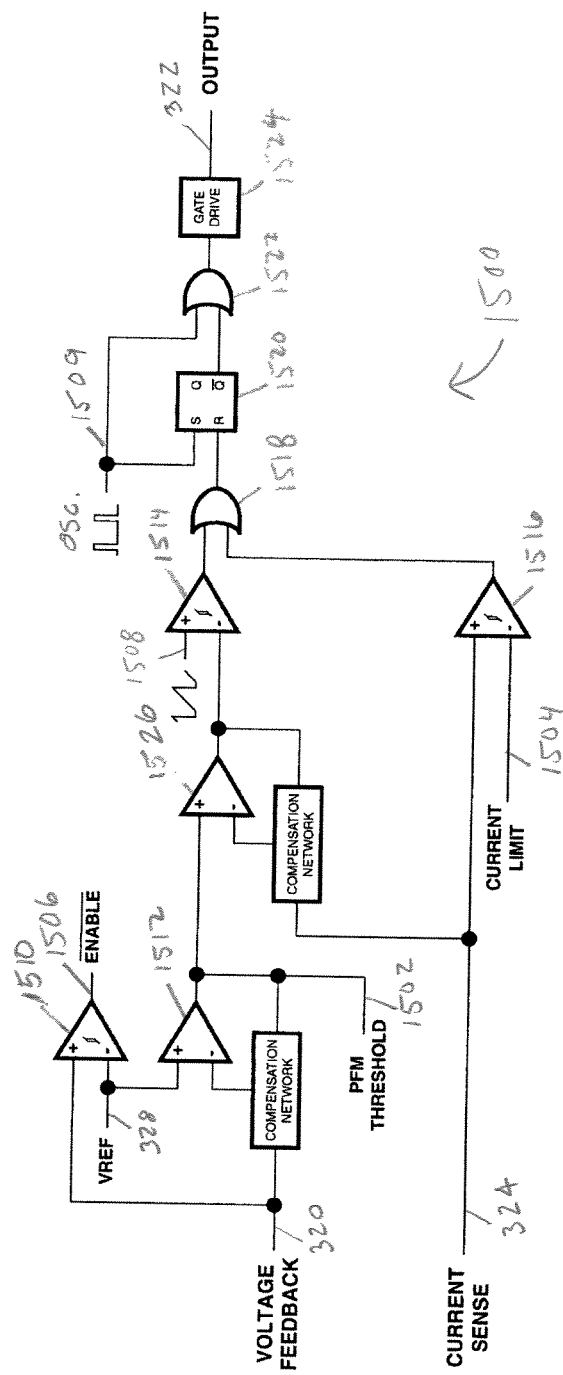
FIG. 15 illustrates a schematic diagram of an analog PFM/PWM SMPS controller, according to yet another specific example embodiment of this disclosure.

Referring to FIG. 15, depicted is a schematic diagram of an analog PFM/PWM SMPS controller, according to yet another specific example embodiment of this disclosure. An analog PFM/PWM SMPS controller, generally represented by the numeral 1500, comprises voltage comparators 1510, 1514 and 1516; operational amplifiers 1512 and 1526 having compensation networks, OR gates 1518 and 1522, an RS flip-flop 1520, and a driver 1524. An oscillator (not shown) supplies a clock signal at node 1509.

The comparator 1510 is used to generate an enable signal at node 1506 whenever the voltage feedback signal at node 320 is greater than a reference voltage, Vref, at node 328. The reference voltage, Vref, may be supplied from a very low power voltage reference (not shown). The operational amplifier 1512 is part of the control loop wherein an error signal from the output of the operational amplifier 1512 is used to control the PFM and PWM generator. This error signal is based upon a difference between the voltage feedback signal and reference voltage.

The embodiment shown in FIG. 15 employs average current mode control. A fixed voltage ramp at node 1508 is the controlled quantity applied to the positive input of comparator 1514. The operational amplifier 1512 produces an error signal applied to the positive input of a second operational amplifier 1526. The error signal establishes the average current demand. Operational amplifier 1526 produces an error signal applied the negative input of comparator 1514 acting on the controlled quantity and, effectively, controls the duty cycle demand. The PFM threshold is a clamp applied to the output of operational amplifier 1512. This establishes a minimum average current demand. Whenever the clamp is active, PFM operation will be invoked. The volt-time across the inductor 442 is not balanced for the input and output conditions. Therefore, the output voltage cannot be in a steady-state condition and is in a rising transition state. In PFM operation, the average output is maintained by the hysteretic comparator 1510 enabling and disabling the PFM and PWM duty cycle generators, effectively reducing the number of switch transitions per time period. Whenever the operational amplifier 1512 produces an error signal greater than the PFM threshold, PWM operation will be invoked. The volt-time across the inductor 442 is balanced. Therefore, the output voltage is in a steady-state condition. In PWM operation, the output voltage is maintained by the PWM duty cycle demand established via the error signal. The hysteretic comparator 1510 enables the control continuously. Comparator 1516 is utilized for over current protection in abnormal operating conditions.

Figure 16:
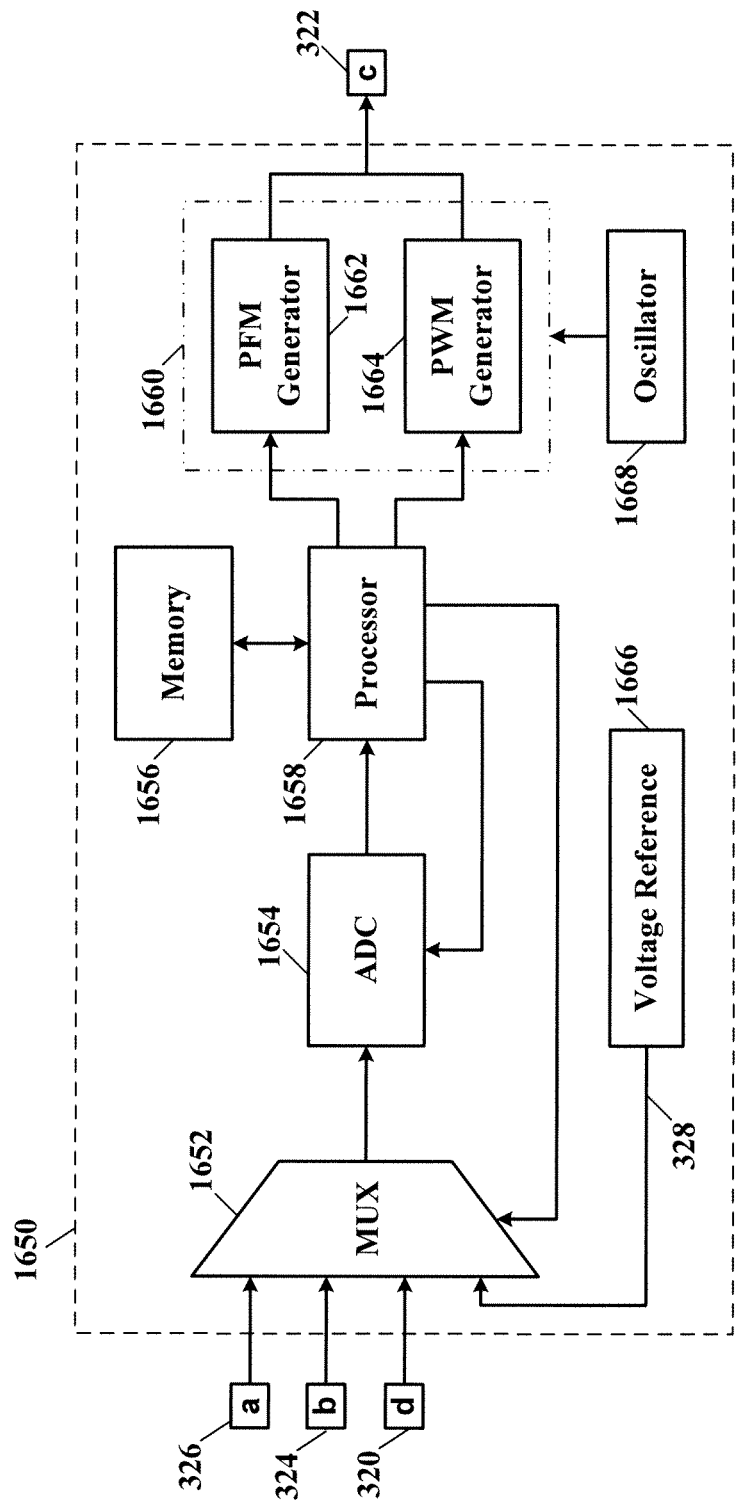
FIG. 16 illustrates a schematic diagram of a digital/programmed PFM/PWM SMPS controller using a mixed signal integrated circuit device, according to still another specific example embodiment of this disclosure.

Referring to FIG. 16, depicted is a schematic diagram of a digital/programmed PFM/PWM SMPS controller using a mixed signal integrated circuit device, according to still another specific example embodiment of this disclosure. A mixed signal integrated circuit device 1650 comprises an analog multiplexer 1652, an analog-to-digital converter (ADC) 1654, a memory 1656, a processor 1658, a pulse generator 1660 for generating either pulse frequency modulation (PFM) or pulse width modulation (PWM), a voltage reference 1666 and a clock oscillator 1668.

The multiplexer 1652 is used to select various analog signals for coupling to the ADC 1654. The ADC 1654 converts these analog signals into digital representations and sends the digital representations to the processor 1658. The processor is controlled by a software program stored in the memory 1656. The memory 1656 may be volatile and/or non-volatile memory. The analog signals may be for example, but are not limited to, a voltage feedback signal at node 320, a current sense signal at node 324, a feed forward signal at node 326, and a reference voltage at node 328.

The pulse generator 1660 may comprise separate PFM and PWM generators that are selected and controlled by the processor, or the pulse generator 1660 may comprise a PWM generator and a pulse swallowing circuit so that the PWM generated pulses can be converted to PFM or pulse density modulation (PDM) control signals, according to the teachings of this disclosure. The output from the pulse generator 1660 applies its pulse train output at the node 322 that may be coupled the power switches 444 and 446 through a driver 1524. Operation of the mixed signal integrated circuit device 1650 may be programmed according to the teachings of this disclosure.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A switch mode power supply (SMPS) using pulse-density modulation (PDM) control or pulse-width modulation (PWM) control, said SMPS comprising:
   a switch mode power supply (SMPS) converter; and
   a load determination circuit for detecting when a load current reaches a transition current value, comprising:
      a PWM error generator generating a PWM demand signal;
      a threshold generator generating a PDM demand signal;
      a hysteretic comparator receiving a current sense signal and being operable to enable the PWM error generator and the PDM threshold generator dependent on the current sense signal; and
      a fixed frequency oscillator and power circuit driver receiving th PWM demand signal and the PDM demand signal, wherein, when the PWM error generator and PDM threshold generator are enabled, the fixed frequency oscillator and power circuit driver outputs fixed frequency pulses or pulse width modulated pulses having said fixed frequency depending on whether the PWM error generator generates a duty cycle demand signal.

2. The SMPS according to claim 1, wherein the SMPS converter is selected from the group consisting of buck, boost, buck-boost, and fly-back.

3. The SMPS according to claim 1, wherein the SMPS converter uses power field effect transistors as power switches.

4. The SMPS according to claim 1, wherein the load determination circuit is formed by a microcontroller comprising a analog-to-digital converter, a voltage reference and processing means and a PWM generator and a pulse swallowing circuit, wherein the processing means control the PWM generator and pulse swallowing circuit such that when in PDM mode, the PWM generator outputs fixed frequency pulses controlled by the pulse swallowing circuit and when in PWM mode, the PWM generator provides pulse width modulated pulse.

5. The SMPS according to claim 4, wherein the microcontroller further comprises an analog multiplexer coupled with said ADC.

6. The SMPS according to claim 1, wherein the load determination circuit is an analog PDM/PWM SMPS controller operating under a peak current mode.

7. The SMPS according to claim 1, wherein the PDM/PWM SMPS controller comprises a PWM comparator receiving an error signal and the current sense signal to which a slope compensation ramp signal is added.

8. The SMPS according to claim 1, wherein the load determination circuit (208) is an analog PDM/PWM SMPS controller operating under a direct duty cycle mode.

9. The SMPS according to claim 1, wherein:
   the PDM/PWM SMPS controller comprises a PWM comparator receiving an error signal and a fixed voltage ramp signal.

10. The SMPS according to claim 1, wherein the load determination circuit is an analog PDM/PWM SMPS controller operating under an average current mode.

11. The SMPS according to claim 10, wherein the PDM/PWM SMPS controller comprises a comparator receiving an error signal and a current sense signal via a compensation network.

12. A method for controlling a switch mode power supply (SMPS) using pulse-density modulation (PDM) control or pulse-width modulation (PWM) control, said method comprising the steps of:
   determining a load current of a switch mode power supply (SMPS) converter;
   comparing the load current to a transition current value;
   providing pulses having a fixed frequency and a predetermined pulse width;
   if the load current is below the transition current value;
      performing a pulse density modulation of said fixed frequency pulses;

and if the load current is equal or above the transition current value then performing a pulse width modulation of said pulses having a fixed frequency.

13. The method according to claim 12, wherein the SMPS converter is selected from the group consisting of buck, boost, buck-boost, and fly-back.

14. The method according to claim 12, wherein the step of determining the load current comprises the steps of:
  converting the load current into a voltage representing the load current; and
  comparing the voltage representing the load current to a reference current limit voltage with a voltage comparator, wherein
  if the voltage representing the load current is less than the reference current limit voltage then outputting a first logic level from the voltage comparator, and
  if the voltage representing the load current is equal to or greater than the reference current limit voltage then outputting a second logic level from the voltage comparator.

15. The method according to claim 14, wherein
  the pulses having a fixed frequency and a predetermined pulse width are provided by a PWM generator which is controlled in the PDM mode to generate said predetermined pulse width and in PWM to generate a variable pulse width.

16. The method according to claim 15,
  wherein when in PDM mode, pulses provided by said PWM generator are filtered out by a pulse swallowing circuit.

17. The method according to claim 12, wherein an analog PDM/PWM SMPS controller operating under a peak current mode is provided to determine a load current.

18. The method according to claim 17, wherein the PDM/PWM SMPS controller comprises a PWM comparator receiving an error signal and the method comprises adding the current sense signal to a slope compensation ramp signal.

19. The method according to claim 12, wherein an analog PDM/PWM SMPS controller operating under a direct duty cycle mode is provided to determine a load current.

20. The method according to claim 19, further comprising receiving an error signal and a fixed voltage ramp signal by a PWM comparator.

21. The method according to claim 12, wherein an analog PDM/PWM SMPS controller operating under an average current mode is provided to determine a load current.

22. The method according to claim 21, further comprising receiving an error signal and a current sense signal via a compensation network by a comparator.

* * * * *